Jan. 9, 1940.   R. A. BAUDRY   2,186,232
VENTILATION OF TOTALLY ENCLOSED DYNAMO-ELECTRIC MACHINES
Filed Jan. 29, 1938   2 Sheets-Sheet 2
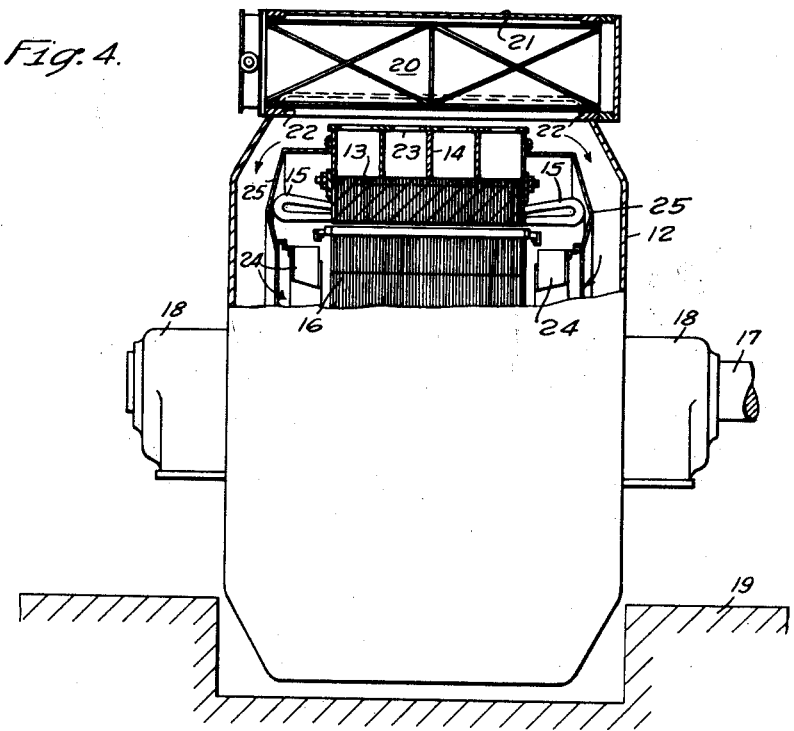
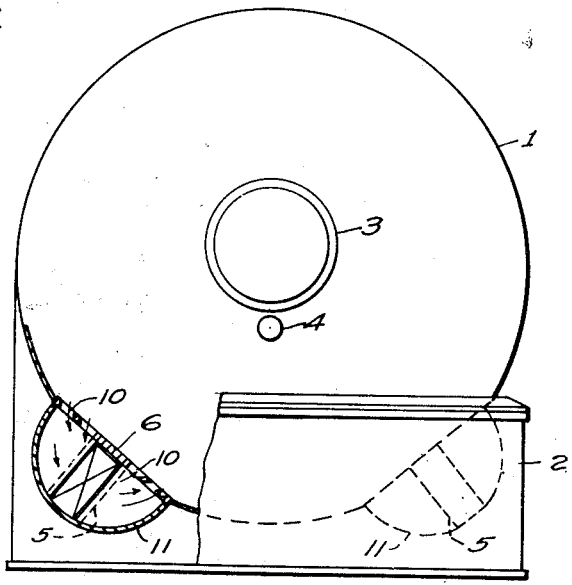
WITNESSES:
INVENTOR
René A. Baudry.
BY
ATTORNEY Patented Jan. 9, 1940

2,186,232

UNITED STATES PATENT OFFICE 2,186,232

VENTILATION OF TOTALLY ENCLOSED DYNAMO-ELECTRIC MACHINES

René A. Baudry, Pittsburgh, Pa., assignor to Westinghouse Electric & Manufacturing Company, East Pittsburgh, Pa., a corporation of Pennsylvania Application January 29, 1938, Serial No. 187,725

2 Claims. (Cl. 171—252)

The present invention relates to the ventilation of totally enclosed dynamo-electric machines, and, more specifically, to an arrangement of coolers or heat exchanges for cooling the ventilating gas in large, totally enclosed machines.

In large high-speed dynamo-electric machines, such as turbo-generators, synchronous condensers and large motors, special provision must be made for adequate ventilation so as to avoid overheating of the machine, and in many cases, hydrogen is used as a cooling medium because it is superior to air for this purpose and, therefore, makes it possible to obtain a greater output from a given machine. When hydrogen is used, however, it is necessary to completely enclose the machine in a gas-tight housing to prevent loss of the gas or its contamination by air, which might result in an explosive mixture.

When the machine is totally enclosed, some means must be provided for cooling the gas. This may be done by providing an external cooling means and circulating system, but this increases the complication and expense of the installation. It is preferable, therefore, to use coolers or heat exchangers located in the housing and these are usually of the type in which water is circulated through tubes while the gas is allowed to flow over and around them. It is often desirable to have such coolers extend longitudinally of the housing in order to have the greatest possible cooling surface in contact with the gas. It is also desirable to use a cylindrical housing since this shape is best adapted to withstand internal explosion pressures.

The problem of placing longitudinal coolers inside a cylindrical housing without making the housing unduly large for the size of the machine is a rather difficult one, since the available space inside the housing is quite limited, and it is also very difficult to arrange the coolers so as to provide access to their ends for inspection and repair and for making the necessary connections for circulating water through them. These considerations often require special construction of the coolers, which increases their complication and cost.

It is the object of the present invention to provide an arrangement of coolers for totally enclosed machines which will avoid the difficulties mentioned above.

A more specific object of the invention is to provide an arrangement in which longitudinal coolers are located on the exterior of the housing and provision is made for the gas to circulate freely through the coolers to obtain the maximum cooling effect.

These objects are attained by providing a plurality of longitudinal cooling chambers on the exterior of the housing. The coolers are placed in these chambers and openings are provided in them communicating with the interior of the housing, so that the gas is permitted to flow freely into the chambers and circulate through the coolers. This insures the maximum cooling of the gas and permits easy access to the coolers without requiring any undesirable complication in their construction.

The invention will be more fully understood from the following detailed description taken in connection with the accompanying drawing, in which:

Fig. 3 is a view similar to Fig. 2 showing an alternative arrangement; and

Fig. 4 is a side view, partly in section, of a totally enclosed motor.

Figure 1:
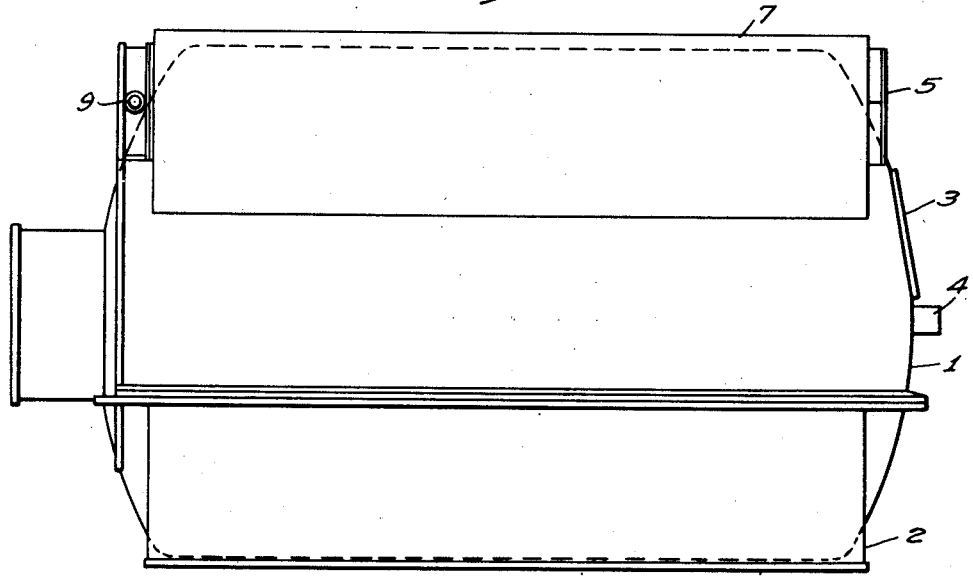
Figure 1 is a side elevation of a synchronous condenser.
Figure 2:
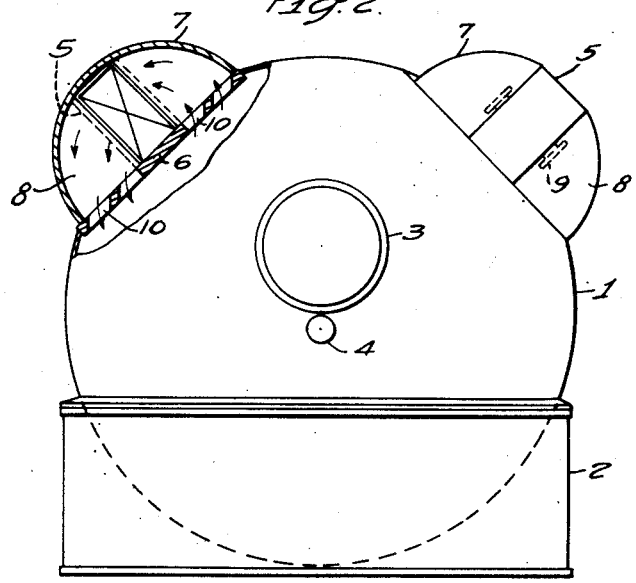
Fig. 2 is an end view, partly in section, of the same machine.

Figs. 1 and 2 show the invention as applied to a large synchronous condenser having a generally cylindrical gas-tight housing 1 supported on a base 2 and having an opening 3 to permit access to the interior of the housing. This opening is normally closed by a door provided with gas-tight sealing means. The machine itself consists of the usual stator member supported in the housing and a rotor member supported on a shaft 4 which rotates in bearings inside the housing at each end of the machine.

For the purpose of cooling the machine, the housing 1 is filled with a suitable ventilating gas, which is preferably hydrogen, and provision is made for cooling this gas by means of a plurality of coolers or heat exchange units 5, two of which are shown on the drawing. These coolers are arranged longitudinally of the machine and are positioned on the exterior of the housing and secured to flattened portions 6 of its surface. In order to prevent escape of the hydrogen, the coolers are located in cooling chambers formed by hollow longitudinal members 7, which are secured to the housing with gas-tight joints and closed at the ends by suitable gas-tight end members 8 through which the coolers extend.

The members 7 have been shown as semi-circular in cross-section but they may be of any desired shape since the stresses resulting from internal explosion pressures are carried by the portions 6 of the housing rather than by the members 7, so that the latter do not have to be designed to withstand large internal pressures. For this reason, they may be of any desired shape and may be of rather light construction since their only purpose is to prevent escape of the hydrogen.

The coolers may be of any suitable construction, but are preferably of the type in which water is circulated through a plurality of tubes over which the gas flows, and connections 9 for circulating the water are provided at one end of the coolers. Openings 10 are provided in the housing to permit the gas to circulate through the cooling chambers, as shown by the arrows in Fig. 2. The rotation of the rotor tends to cause circulation of the gas in the general direction shown, and this effect may be increased, if desired, by fans or blowers mounted on the rotor shaft.

An alternative arrangement of the coolers is shown in Fig. 3, which is a view corresponding to Fig. 2, and in which corresponding parts of the machine are designated by the same reference numerals. In this arrangement, the coolers are placed in cooling chambers 11 which are located on the lower part of the housing within the base 2. The gas circulates through these cooling chambers in the same manner as described above, and their construction is the same as that of the chambers previously described. This arrangement has the advantages that the cooling chambers are concealed in the base of the machine, giving it a better appearance, and also that the overall size of the machine is not increased, which is an important consideration in the case of large machines since their size is limited by available shipping facilities. It is to be understood that with the arrangement of either Fig. 2 or Fig. 3, any desired or necessary number of coolers may be used, and that, if desired, coolers could be placed on both the upper and lower parts of the housing.

The internal construction of machines of the general type with which this invention is concerned is shown in Fig. 4, which is a partial sectional view of a large motor adapted for hydrogen cooling. This motor has an outer generally cylindrical gas-tight housing 12 and consists of a stator member comprising a laminated core 13 supported on a frame structure 14 and carrying suitable windings 15, and a rotor member 16 which is keyed or otherwise secured to a shaft 17. The shaft is supported in bearings 18 at each end of the machine and the machine as a whole rests on a suitable base or foundation 19.

The housing 12 is filled with hydrogen for the purpose of cooling the machine and one or more coolers or heat exchange units 20 are provided to cool the gas. These coolers are placed on the exterior of the housing and enclosed in cooling chambers 21 similar to the cooling chambers described above. Large openings 22 are provided between the housing 12 and the cooling chambers 21 to permit the gas to flow through the coolers. In operation, the gas circulates in the direction shown by the arrows over the rotor and radially through ventilating ducts in the rotor 16 and stator core 13. The gas flows out of the machine through openings 23 in the frame 14 and through the openings 22 into the cooling chamber 21, where it flows longitudinally over the cooler 20 towards the ends of the machine and back into the housing, as shown by the arrows. If desired, fans 24 may be provided on the rotor to assist in circulating the gas, and end bells 25 may be secured to the frame to prevent heated gas from recirculating through the machine without passing through the cooler. Any desired number of coolers may be used and they may be arranged either on the upper part of the machine or on the lower part, as desired.

It is to be understood that the arrangement of coolers described above may be used with any totally enclosed machine, and is not limited in its application to the particular types of machines shown. It should also be understood that, although the invention has been described largely with reference to hydrogen-cooled machines, it is applicable to machines using any other gaseous cooling medium, such as air. Any suitable type of coolers or heat exchangers may be used and, in any particular case, any necessary or desirable number of such coolers may be used, and they may be placed either on the upper or lower part of the housing or even in both locations, if a large number of coolers is necessary.

It will be seen that the present invention makes it possible to use coolers extending longitudinally of the machine and, by placing them in cooling chambers on the outside of the housing, any undesirable increase in the size of the housing is avoided, while still retaining a generally cylindrical shape, and that this is done without any sacrifice in the effectiveness of cooling. This arrangement also permits easy access to the ends of the coolers for inspection and maintenance and greater ease in making the connections for circulating water through them without requiring any special construction of the coolers.

Although a specific embodiment of the invention has been illustrated and described, it is to be understood that it is not limited to the particular details of construction shown, but in its broadest aspects includes all modifications and embodiments which come within the scope of the appended claims.

I claim as my invention:

1. A totally enclosed dynamo-electric machine having a stator member, a rotor member, a generally cylindrical, gas-tight housing completely enclosing the machine and containing a ventilating gas, said housing having a plurality of flattened portions extending longitudinally for substantially its entire length, said flattened portions having openings into the interior of the housing, a cooler mounted on each of the flattened portions, and means secured to the housing for enclosing the coolers and openings in gas-tight chambers through which the gas may circulate freely.

2. A totally enclosed dynamo-electric machine having a stator member, a rotor member, a generally cylindrical, gas-tight housing completely enclosing the machine and containing a ventilating gas, said housing having a plurality of flattened portions extending longitudinally for substantially its entire length, said flattened portions having openings into the interior of the housing, a cooler mounted on each of the flattened portions, and gas-tight chambers secured to the housing over each of said flattened portions, said chambers enclosing the coolers and openings, whereby the gas may circulate freely through the chambers.

RENÉ A. BAUDRY.